(12) United States Patent
Rizzo et al.

(10) Patent No.: US 7,698,679 B2
(45) Date of Patent: Apr. 13, 2010

(54) METHOD AND APPARATUS FOR AUTOMATIC ROUTING YIELD OPTIMIZATION

(75) Inventors: Olivier Rizzo, Roquebrune/Argens (FR); Hanno Melzner, Sauerlach (DE); Jacques Herry, Draguignan (FR)

(73) Assignee: Infineon Technologies AG, Munich (DE)

( * ) Notice: Subject to any disclaimer, the term of this patent is extended or adjusted under 35 U.S.C. 154(b) by 911 days.

(21) Appl. No.: 11/485,839

(22) Filed: Jul. 13, 2006

(65) Prior Publication Data

US 2008/0010934 A1    Jan. 17, 2008

(51) Int. Cl.
    *G06F 17/50*    (2006.01)
(52) U.S. Cl. ............. 716/12; 716/2; 716/7; 716/8; 716/11
(58) Field of Classification Search ............. 716/2, 716/7, 8, 11, 12
    See application file for complete search history.

(56) References Cited

U.S. PATENT DOCUMENTS

| | | | | |
|---|---|---|---|---|
| 5,260,597 | A * | 11/1993 | Orbach et al. ............... | 257/529 |
| 5,636,133 | A | 6/1997 | Chesebro et al. ............. | 716/4 |
| 5,923,563 | A | 7/1999 | Lavin et al. .................. | 716/19 |
| 5,953,518 | A | 9/1999 | Sugasawara et al. ... | 395/500.11 |
| 6,305,000 | B1 | 10/2001 | Phan et al. ................... | 716/5 |
| 6,615,400 | B1 | 9/2003 | Lukanc ........................ | 716/11 |
| 6,738,954 | B1 | 5/2004 | Allen et al. .................... | 716/4 |
| 6,904,581 | B1 | 6/2005 | Oh ................................ | 716/10 |
| 7,014,957 | B1 * | 3/2006 | Zarkesh-Ha et al. ........... | 430/5 |
| 7,383,521 | B2 * | 6/2008 | Smith et al. ................... | 716/6 |

FOREIGN PATENT DOCUMENTS

WO    WO 03/092067    11/2003

OTHER PUBLICATIONS

Rizzo et al.,"Concurrent Wire Spreading, Widending, and Filling", Jun. 2007, DAC Conference, Technical Digest, pp. 350-353.*
Sinha et al., "A Yield Analysis, Estimation and Enhancement Tool", available at http://research.synopsys.com/projects/pdf/dfmprojectpage_ver4.pdf downloaded Jun. 20, 2006.
Papadopoulou, "Critical Area Computation for Missing Material Defects in VLSI Circuits", Proceedings of the 2000 international symposium on Physical design table of contents, San Diego, pp. 140-146, 2000, ISBN: 1-58113-191-7.
Bakker, "Using Calibre in a Design for Manufacturability Environment", Deep Submicron Technical Publication, Sep. 2001, presented at the 2001 IC Design Technical Forum.

* cited by examiner

*Primary Examiner*—Sun J Lin
(74) *Attorney, Agent, or Firm*—Davidson, Davidson & Kappel, LLC

(57) ABSTRACT

A method is provided for optimizing routing on a substrate such as an integrated circuit or printed circuit board. The method defines a plurality of parallel strips on an initial routing layout of conductors for a layer of an integrated circuit. Each conductor within each strip defines a brick. For each of the plurality of strips, a spacing between bricks and a brick thickness of each brick is adjusted as a function of i) a location of a brick in adjacent strips corresponding to the same conductor; ii) a desired brick thickness; and iii) a desired brick spacing.

26 Claims, 9 Drawing Sheets

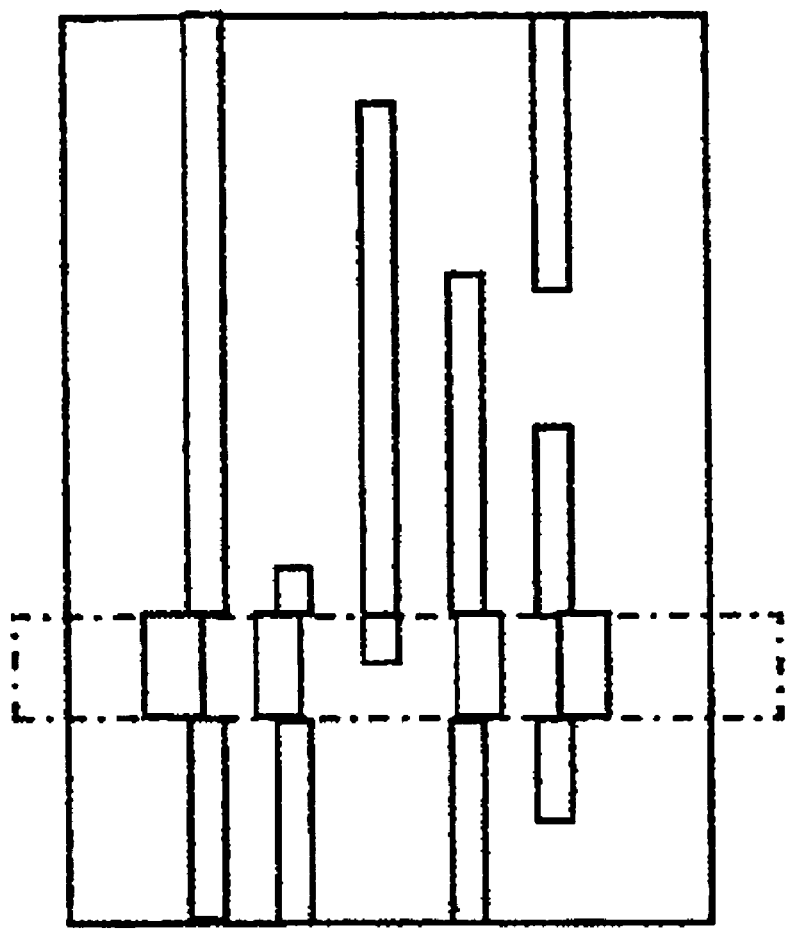
FIGURE 4

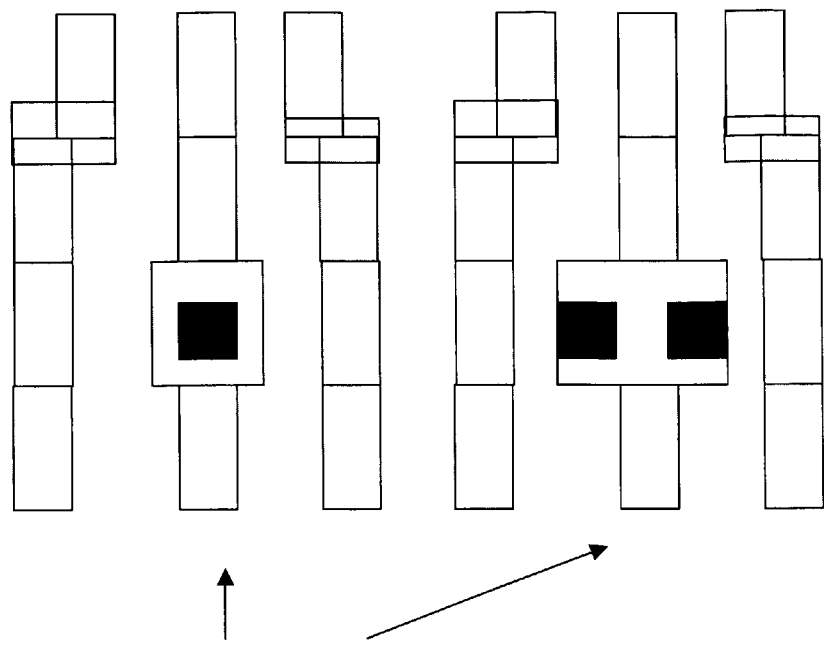
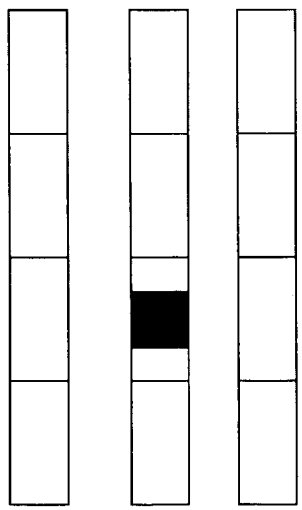

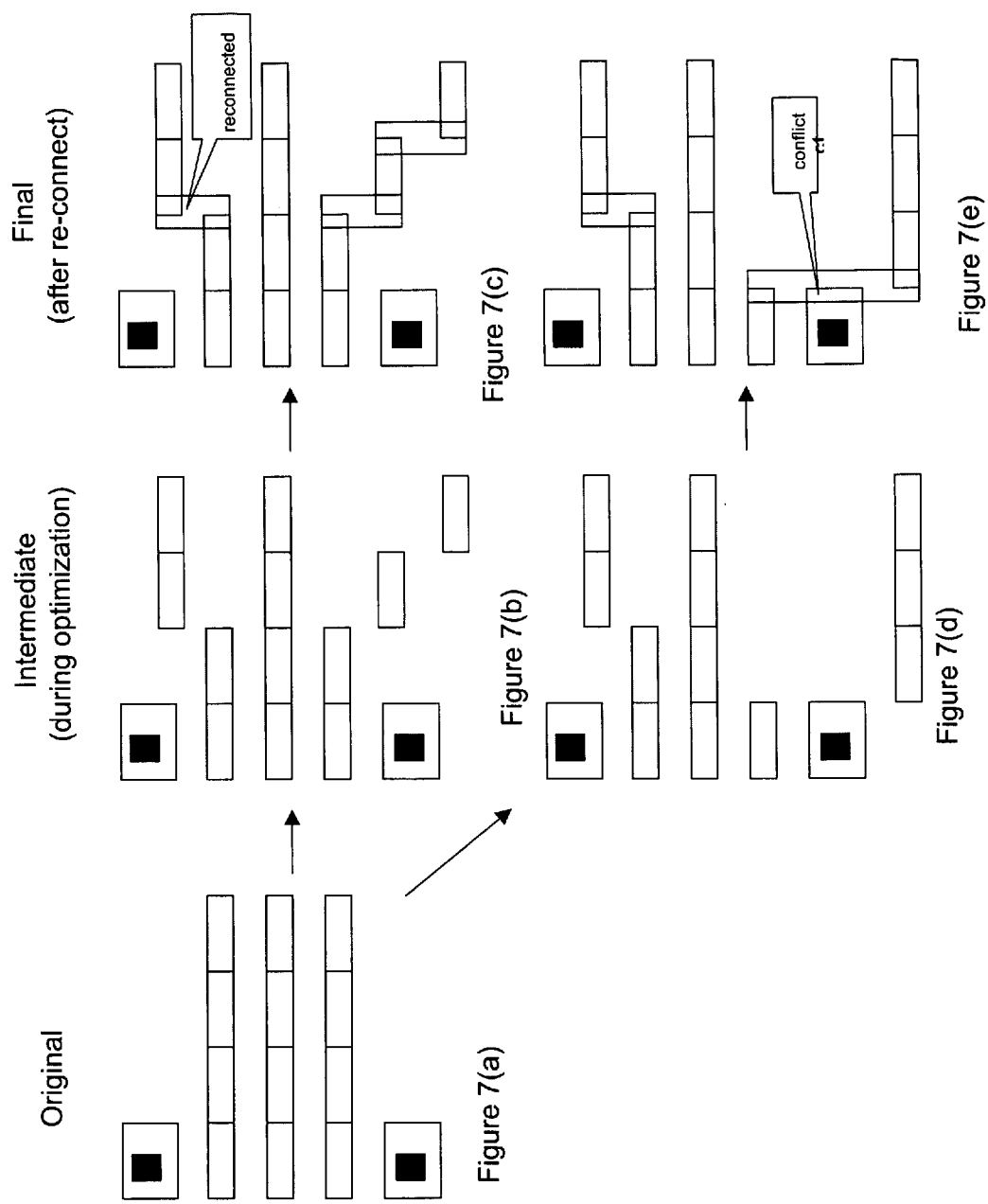

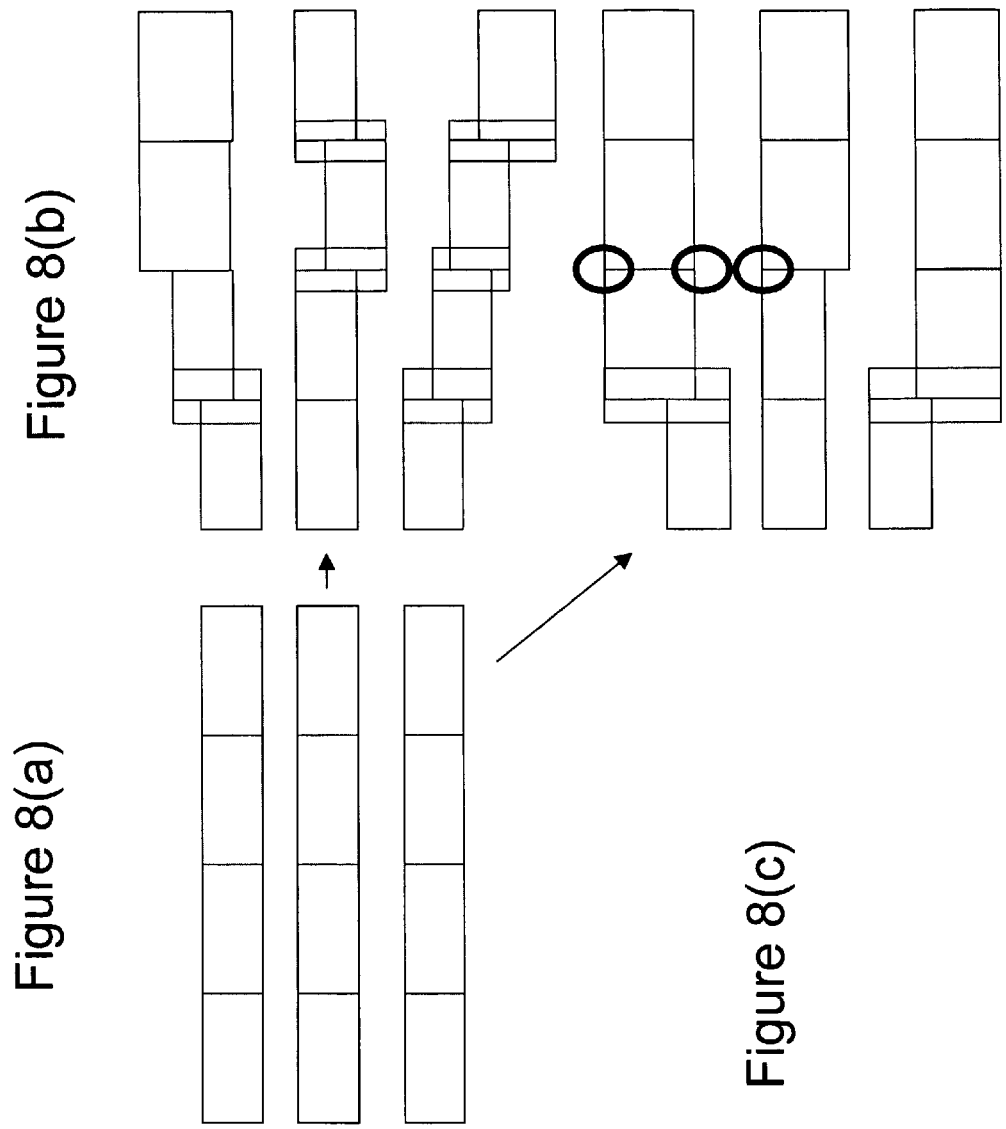

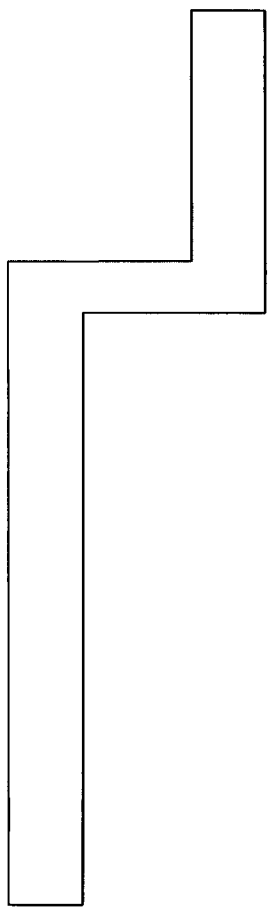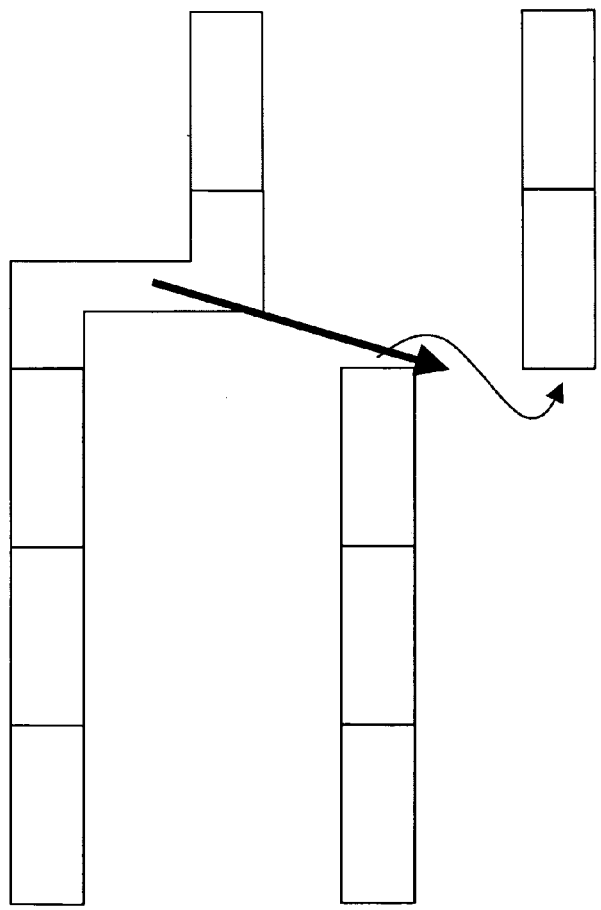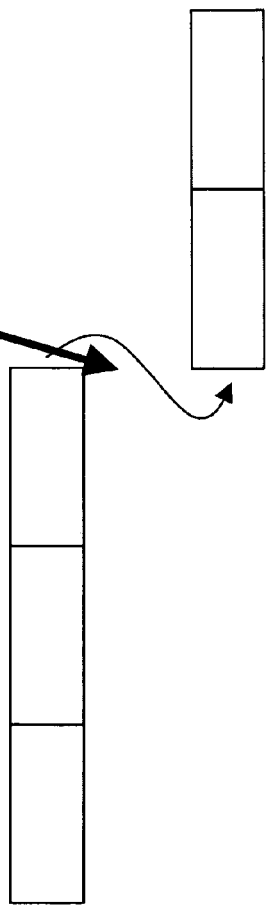
Figure 9(a)
Figure 9(b)
Figure 9(c)

METHOD AND APPARATUS FOR AUTOMATIC ROUTING YIELD OPTIMIZATION

FIELD OF THE INVENTION

The present invention relates to the field of automatic routing yield optimization for Integrated Circuits (ICs), printed circuit boards (PCBs) and similar products.

BACKGROUND OF THE INVENTION

Integrated circuits (ICs) are typically composed of several layers of conducting, insulating and other components that are structured in a horizontal dimension by fabrication processes.

Shorts and Opens are two categories of random yield defects that occur during the fabrication process. EMCA (Extra Material Critical Area) is a measure of an integrated circuit layout geometry that defines the susceptibility of the device to defects that unintentionally make an electrically conductive connection between conductive regions of the circuits ("Shorts"). MMCA (Missing Material Critical Area) is a measure of an integrated circuit layout geometry that defines the susceptibility of the device to defects that unintentionally interrupt an electrical connection between conductive regions of the circuit ("Opens"). "Extra material" defects are defects which cause shorts between different conducting regions and "missing material" defects are defects which cause open circuits in a conducting region.

Yield losses may also be caused by insufficient, excessive, or inhomogeneous material density. Fabrication of ICs typically requires that material density—that is, the percentage of conductive material in a conductor layer, averaged across spatial regions of specified size—lies within specified upper and lower limits and does not change rapidly between adjacent such regions. Fabrication processes can typically be simplified, executed in a more robust manner and achieve higher yield if spatial variations in material density can be reduced by appropriate layout.

It is known in the art to modify the routing layout and geometry of conductors, vias, contacts and other components in order to reduce yield defects.

BRIEF DESCRIPTION OF THE DRAWINGS

FIG. 4 shows the frame of FIG. 2 including the initially optimized strip of FIG. 3, but before the adjacent strips have been optimized.

FIG. 5(a) illustrates an initial layout with a via.

FIG. 5(b) illustrates an optimized layout with a via with an enlarged conductor overlap.

FIG. 5(c) illustrates an optimized layout with a double via.

FIGS. 7(a-e) illustrate the manner in which bricks of a conductor can be separated during interim optimizations steps and re-connected in a final optimization step.

FIG. 8(a) illustrates an initial unoptimized layout.

FIG. 8(b) illustrates jogs that may be generated during optimization if a loss function of the optimization process does not take into account the undesirability of such jogs.

FIG. 8(c) illustrates an optimized layout in which the loss function of the optimization process has provided a weight or bonus if brick thickness and/or edge positions align to that of the neighbor brick of the same conductor.

FIGS. 9(a-c) illustrate how complex shapes can be eliminated in a jog by moving the jog to a brick boundary.

DETAILED DESCRIPTION OF THE INVENTION

In accordance with a first embodiment of the present invention, a method is provided for optimizing routing on a substrate such as an integrated circuit, a printed circuit board, a probe card, a multi-chip package, and the like. The method defines a plurality of parallel strips on an initial routing layout of conductors for a layer of an integrated circuit. Each conductor within each strip defines a brick. Preferably, the strips extend in a direction perpendicular to the preferential direction of the routing layout. For each of the plurality of strips, a spacing between bricks and a brick thickness of each brick is selectively adjusted as a function of i) a location of a brick in adjacent strips corresponding to the same conductor; ii) a desired brick thickness; and iii) a desired brick spacing.

In accordance with a second embodiment of the present invention, an optimization tool is provided, which comprises a processor programmed to perform the steps of the first embodiment.

In accordance with a third embodiment of the present invention, computer readable media are provided, having stored thereon, computer executable process steps operable to instruct a computer to perform the steps of the first embodiment.

As technologies for integrated circuits continue to scale down toward nanometer dimensions, layout geometries become smaller and manufacturability issues impact high yield and reliability.

Figure 1:
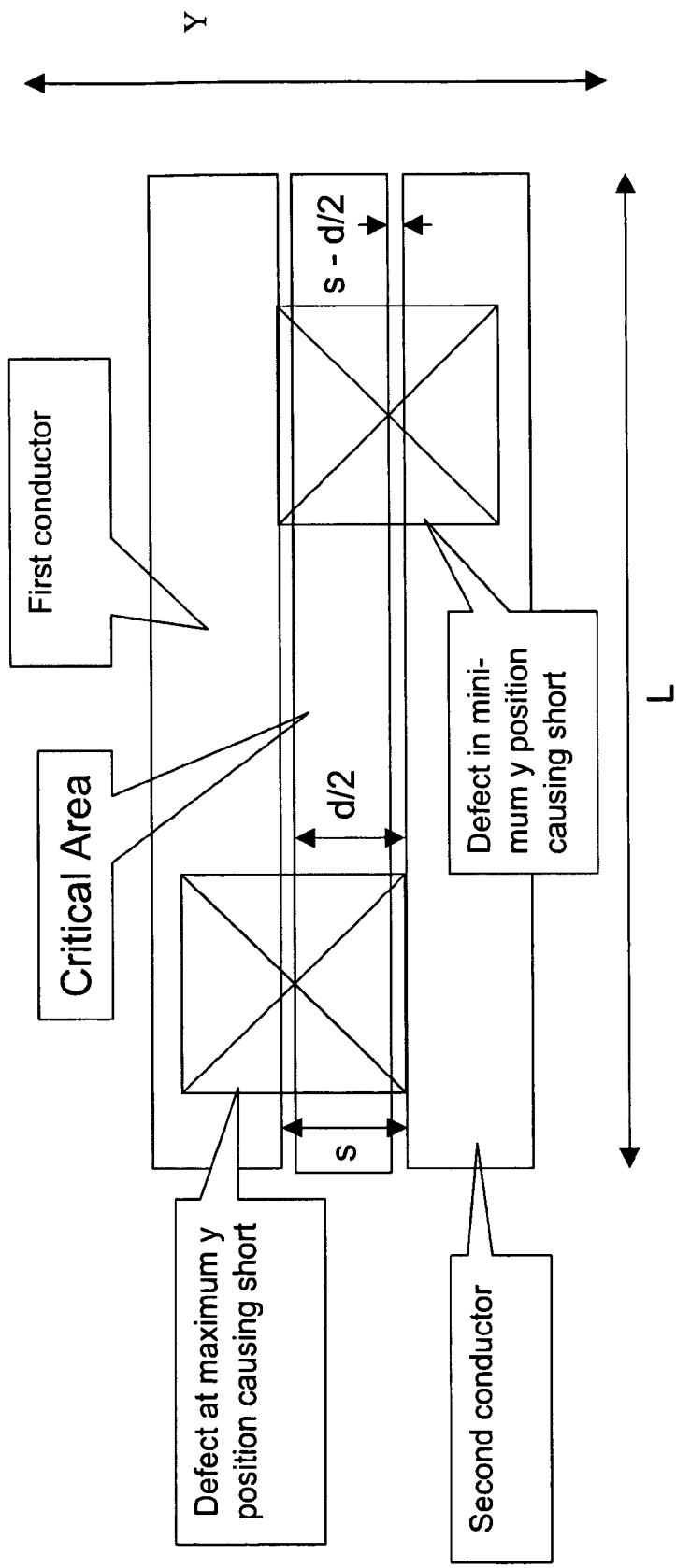
FIG. 1 illustrates an Extra Material Critical Area.

As explained above, "extra material" defects are defects which cause shorts between different conducting regions and "missing material" defects are defects which cause open circuits in a conducting region. To reduce EMCA and MMCA related yield loss, it is known to optimize a layout by increasing the size of critical dimensions (e.g., the shape and/or thickness of conductors) and increasing the distances between different conductors. FIG. 1 illustrates the concept of an Extra Material Critical Area. Referring to FIG. 1, a defect of diameter "d" (approximated by a square of conductive material of size d×d) causes a conductive connection between a first and second conductor shape (a Short) if the center of the defect is located within the Critical Area. The size of the critical area is L*(d-s), where "s" is the space between the two conductors. As such, as the space between the two conductors increases, the size of the critical area is reduced, with the critical area decreasing to zero when d=s. Assuming that defects are placed randomly on the layout, decreasing the size of the critical area results in a lower probability that a defect causes a short—and the yield increases.

Yield loss may also be due to CMP (chemical and mechanical polishing). This manufacturing step generally requires a minimum and maximum material density, and a specified degree of homogeneity of material densities. Similarly, constraints on material density may also be required from the application of plasma etching, plasma deposition, and lithography steps, or to simplify the application of those processes, or to lead to a higher yield.

To achieve higher routing density, EDA (Electronic Design Automation) tools use minimum size and spacing rules. Typically improvement of yield is not supported by those tools beyond the compliance to strict minimum (and occasionally maximum) rules called Design Rules (DRs). Filling is typically supported in order to level material density, but typically still leaves considerable density variation because spaces of medium size can not be filled by the relatively large fill structures. In particular, in a routing layout produced by those tools, the great majority of conductors are designed with a standard minimum thickness as dictated by the DRs, and spaces are frequently designed with minimum size, as per DRs.

Wider spacing between different conductor material shapes can improve EMCA. Increasing the size of material features can improve MMCA. Material density can be improved by inserting dummy material fills to increase density and reach the minimum density required for a working window area. In this regard, EDA tools commonly define a working window area (e.g. 10 microns×10 microns), divide a layer of an integrated circuit being routed into a plurality of windows, and specify that each of these windows must achieve a minimum and maximum material (e.g, metal) density. The working window is commonly variable in order to reflect specific "radii of interaction" in different process steps. For instance, CMP may require uniformity on a relatively large scale (for instance, 100 microns×100 microns)—while plasma processing may require uniformity on a medium scale (for instance, 10 microns×10 microns)—and lithography may require uniformity on a relatively short scale (for instance 1 micron×1 micron).

Typically prior art EDA tools follow strict minimum rules (Design Rules) when constructing conductors in a routing layer. EMCA and MMCA is not calculated or optimized during this process. Filling is done, but typically after the electrically active conductors have been defined. That implies that the shape and location of electrically active conductors will not be altered during the filling process. As an effect, the filling is often under-optimized and leaves considerable material density variations. For instance, a medium size space can frequently not be filled in order to achieve proper density because there may be not enough room to insert the relatively large fill structures supported by these tools. Because the electrically active conductors can not be altered in this step, the space can neither be made smaller (to avoid the need for filling) nor made wider (to allow a fill structure to be inserted). This necessarily restricts the possibilities to achieve a high level of material density uniformity in the layout.

In accordance with various embodiments of the present invention, an automated process is provided which improves routing reliability and manufacturing by concurrently addressing extra, missing and material density constraints.

In accordance with various embodiments of the present invention, a method is provided which improves random defect-limited yield optimization by providing an optimization technique which is not limited to route segments. Preferably, the method implements routing layout optimization by dividing the circuit into a plurality of strips, each strip comprising a plurality of bricks, and separately optimizing each strip. In this manner, EMCA, MMCA, and material density can be improved concurrently without impacting other conductors. In this manner, the method applies the optimizations by area (e.g., strip) and not by conductor segment. The method is implemented as software on a computer.

As explained in further detail below, in accordance with various embodiments of the present invention, a method is provided that can ensure that: a) conductors are correctly distributed in the routing layout; b) the number of conductors spaced at minimum width from each other are reduced in the routing layout; and that c) metal density in the routing layout is uniformly distributed.

In accordance with an embodiment of the present invention, a random defect-limited yield improvement optimization system and method is provided. The system and method define a plurality of strips on an initial routing layout of conductors for a layer of an integrated circuit. The strips extend in a direction perpendicular to the preferential direction of the routing layout, and each conductor within each strip defines a brick. For each of the plurality of strips, a spacing between bricks and a brick thickness of each brick is selectively adjusted as a function of i) a location of a brick in adjacent strips corresponding to the same conductor; ii) a desired brick thickness; and iii) a desired brick spacing.

Preferably, the selectively adjusting step further comprises (a) selecting a first of the plurality of strips, and adjusting a spacing between bricks and a brick thickness of each brick as a function of i) a location of a brick in adjacent strips corresponding to the same conductor in the initial routing layout; ii) a desired brick thickness; and iii) a desired brick spacing to provide an interim routing layout; (b) selecting a second of the plurality of strips, adjacent to the first of the plurality of strips, and adjusting a spacing between bricks and a brick thickness of each brick as a function of i) a location of a brick in adjacent strips corresponding to the same conductor in the interim routing layout; ii) a desired brick thickness; and iii) a desired brick spacing to provide a current interim routing layout; and (c) defining a next adjacent one of the plurality of strips as the second one of plurality of strips and the current interim routing layout as the interim routing layout, and repeating step (b) until a desired degree of stability in the current interim routing layout is achieved.

As described later in more detail, it is also possible to include other factors in addition to the position of adjacent circuit elements in the calculation of the improved size and position of a brick. For example, the size and position of bricks farther away from (i.e., not adjacent to) the brick under consideration can be considered. This allows the optimization process to distribute shapes more globally from dense into empty areas of the layout and thus achieve a greater reduction in Critical Area.

The method preferably adjusts the strips sequentially in one direction and then the other (e.g., left to right, then right to left) until the routing layout achieves a desired degree of stability (e.g., the movement and/or thickness change is within tolerances). For example, as the method sequentially processes strips from left to right, item (i) dictates that a brick n in strip n will not be moved if it will cause a lack of connectivity with adjacent brick n-1 of the same conductor in strip n-1 in a final optimized layout.

It should be noted that while connectivity between two bricks of the same conductor are to be maintained in the final optimized layout, it is not necessary for such bricks to be geometrically connected (overlapping) at each point of time in the optimization process. Bricks that are geometrically unconnected at some point in the calculation but need electrical connection can be re-connected in a final step of the calculation. Instead of maintaining geometrical connection at all points in the calculation, the optimization process (algorithm) can ensure that a re-connecting piece of conductor can be added to the layout in a final step without causing conflicts with any other adjacent shapes of conductors. Allowing loss of geometrical connection in intermediate points of the calculation greatly enhances the flexibility of the algorithm because it reduces constraints. It also reduces calculation time because bricks of a conductor are not added or altered to maintain connectivity at each intermediate optimization step.

It should be noted that the preferential direction can be discerned from the routing layout—it is the direction in which most of the conductors extend. However, the preferential direction is also generally a variable of the routing program that generated the initial routing layout. The preferential routing direction may be the same for the complete layout area, or be different in specific sub-areas of the layout. In latter case, it is possible to detect the preferential routing direction automatically—for example by statistical analysis of the direction and length of shape edges—and select the corresponding direction of the strips in a sub-area of the layout.

As explained above, in accordance with various embodiments of the present invention, a plurality of strips are defined on an initial routing layout of conductors for a layer of an integrated circuit. In this regard, it should be appreciated that the initial routing layout may include additional elements other than conductors, such as for example, vias and fills.

The strips extend in a direction opposite to the preferential routing direction of the routing layout. In this manner, each strip may include for example, conductor segments (or bricks), vias, and fillers. In the discussion that follows, the strips will be described as extending in a vertical direction and having a "width", with the preferential direction extending in a horizontal direction. However, it should appreciated that this designation is arbitrary, and that the strips could be described as extending in a horizontal direction and having a "height", with the preferential direction extending in the vertical direction.

The routing layout onto which the strips are defined can itself be an entire layer of an integrated circuit, or a portion thereof.

Preferably, each strip is of equal width, and the width of the strips are preferably variable as a user input. A number of factors can be considered in selecting the width of the strip, including, for example, the available processing time (processing time decreases with increasing width) and the EMCA and MMCA of the routing layout in its initial, unoptimized state. Notwithstanding, it has been found that a width of about 5 times the minimum conductor width defined for the integrated circuit or printed circuit board provides an advantageous result.

Figure 2:
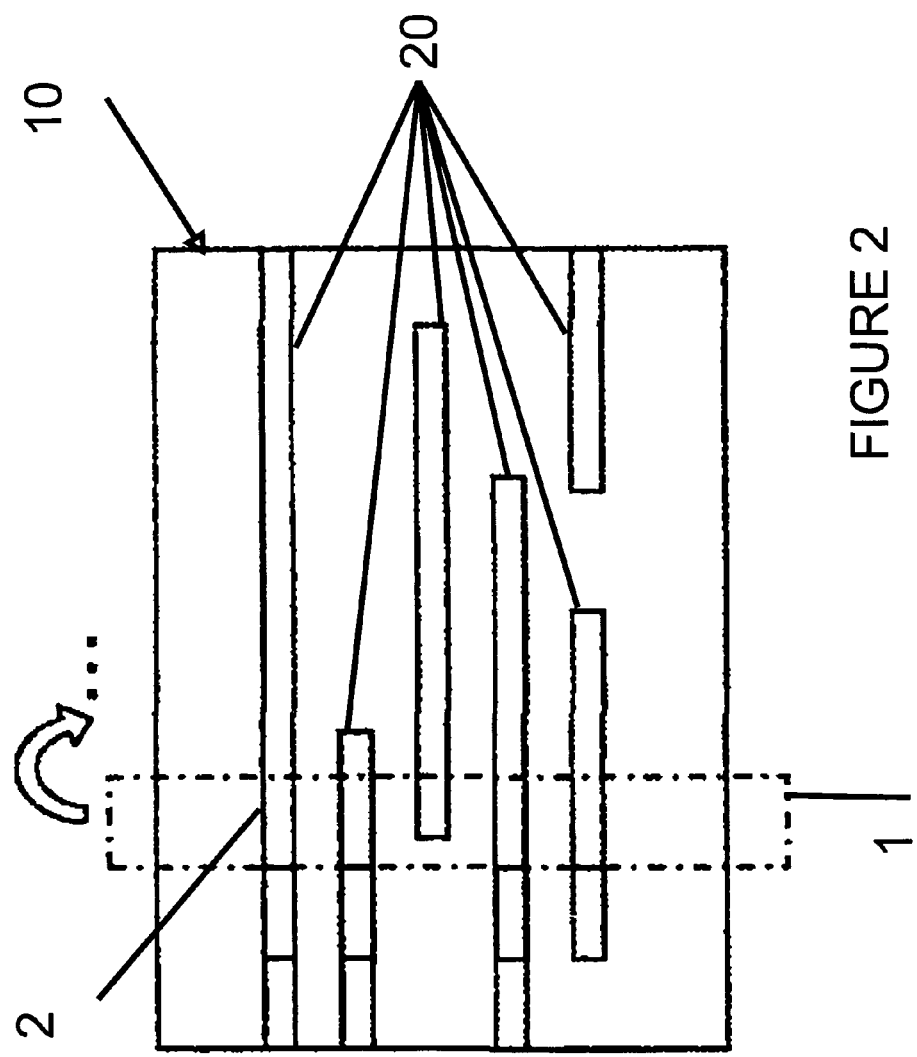
FIG. 2 illustrates a frame including a strip and bricks in accordance with an embodiment of the present invention.

Referring to FIG. 2, an initial routing layout 10 of conductors 20 are shown divided into strips 1 (one of which is shown) oriented in the opposite direction of the preferred routing direction. The routing segments of each conductor that intersect the strip are fractured in smaller rectangular segments, hereinafter referred to as bricks 2. In the illustrated layout (or frame) 10 of FIG. 2, a strip 1 is shown having five bricks (the uppermost one of which is labeled with reference numeral 2).

The resulting brick conductors are organized in sets of bricks related to a strip. These strips are then processed sequentially from left to right and right to left to optimize each of the included bricks. Alternatively, the strips can be processed in another, e.g. quasi random, order. In any event, this iterative process is preferably continued until a estimated yield loss is stable within a desired tolerance.

Figure 3:
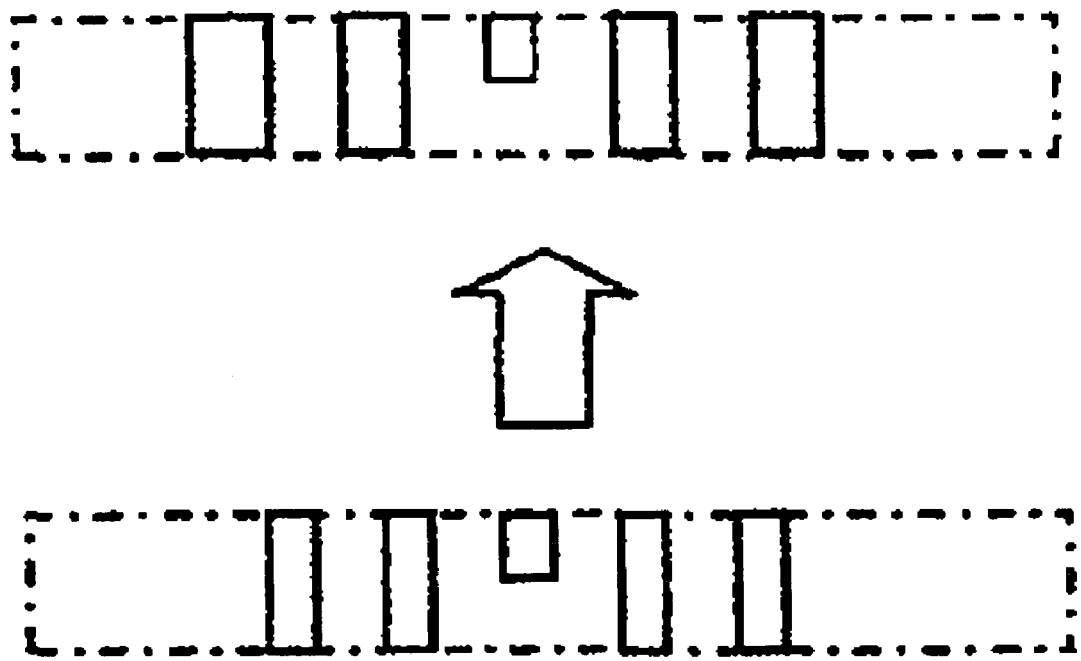
FIG. 3 shows the strip of FIG. 2 before (left side) and after (right side) an initial optimization step.

FIG. 3 shows the strip of FIG. 2 before (left side) and after (right side) an initial optimization step, and FIG. 4 shows the frame of FIG. 2 including the initially optimized strip of FIG. 3, but before the adjacent strips have been optimized. As one of ordinary skill in the art will appreciate, EMCA can be estimated as the sum of the inverse of all spaces between bricks, MMCA can be estimated as the sum of the inverse of the heights of all bricks; and the yield loss can be estimated as the sum of the estimated EMCA and MMCA multiplied by a weighting factor (for defect densities)

As illustrated in FIGS. 3 and 4, for each of the strips, the bricks are uniformly distributed and widened in the strip subject to a set of constraints that can, for example, be defined by the user. For example, the set of constraints may forbid or limit movement of bricks for one more of the following reasons:

1) if the brick is of non-rectangular ("complex") shape and/or is adjacent to a complex shape of the same conductor—(this may help to avoid DR violations or undesirable features such as narrow gaps or notches);

2) if the brick is touched by an upper or lower contact or via hole;

3) if the brick includes a landing pad for a contact or via hole;

4) if the brick has a height exceeding a specified height;

5) if the brick is an end of a conductor (i.e., it does not have left and right neighbors that belong to the same conductor);

6) if the brick is in the leftmost or rightmost strip (e.g., to maintain connectivity to the layout outside of the routing layout (frame) being optimized)

7) if the brick does not extend horizontally across the entire strip.

Complex (that is, non-rectangular) shapes may be computationally intensive to handle in the algorithm and optionally may be excluded from optimization. However, it may also be possible to simplify those complex shapes in a pre-processing step, without changing the electrical functionality of the circuit. In particular, "jogs"—conductor edges running perpendicular to the preferential routing direction—will form one or two complex shapes when cut out by the brick construction algorithm. However, by moving these jogs to brick boundaries before start of the optimization, it is often possible to reduce such a brick in complexity and convert a complex brick to a pair of non-complex bricks that can subsequently be included in the optimization procedure.

It should be noted bricks need not be excluded from movement or resizing for the reasons set forth above. Rather, the inclusion or exclusion of bricks based on these constraints is preferably configurable by the user.

For example, excluding conductors including vias has the advantage of simplifying the process by not requiring layouts of other layers to be considered in the strip optimization process. However, conductors with vias can, if desired, be subject to thickening and/or movement in the adjusting step. Also, even if via positions are held fixed in the optimization, it may be possible to improve the metal shape that makes contact to the via hole, for example by improving the overlap of metal over the via hole. This is because during the repositioning of metal shapes, extra room around those shapes can be created. Larger overlap may frequently improve the robustness of the manufacturing process, in particular by reducing the sensitivity of the layout to metal-to-via misalignment. If sufficient extra room can be created by repositioning metal shapes, it may even be possible to add a second, redundant via to the existing via hole, provided that a corresponding connection can be made in the other layer contacting the via hole. This is illustrated in FIG. 5, wherein FIG. 5(a) illustrates an initial layout with a via (illustrated as a black box), FIG. 5(b) illustrates an optimized layout with a via with an enlarged conductor overlap, and FIG. 5(c) illustrates an optimized layout with a double via. In this regard, redundant via holes are helpful to reduce yield loss and reliability concerns caused by open (non-contacting) vias.

Figure 6B:
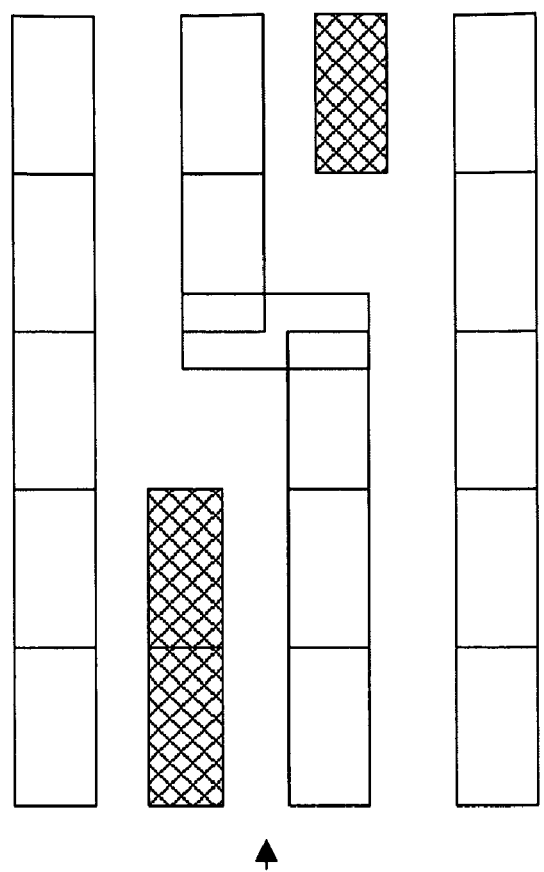
FIGS. 6(a) and 6(b) illustrate a layout before and after insertion of filler bricks, respectively.
Figure 6A:
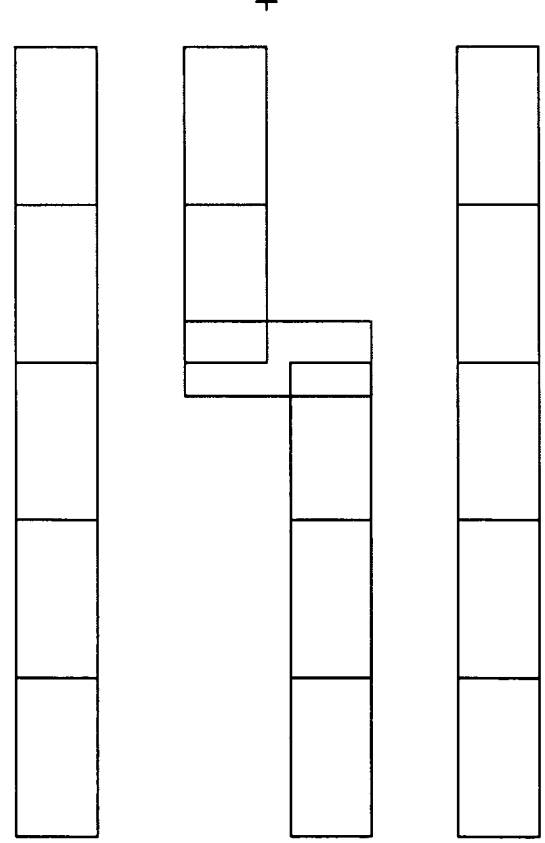

As explained below, filler bricks can be inserted when minimum density cannot be achieved by moving and widening the existing bricks. These filler bricks can be inserted (1) to the initial routing layout of FIG. 2; (2) to each strip before the strip is first optimized; (3) to each strip after the strip is first optimized; (4) to each strip before or after subsequent optimizations; or (5) to the optimized routing layout. FIGS. 6(a) and 6(b) illustrate a layout before and after insertion of filler bricks, where the filler bricks are indicated with a hash pattern.

Adding filler bricks after the adjusting step is simpler, as they are just inserted in the spaces where additional density is needed, and where they won't interfere with the desired routing spacing.

Adding filler bricks before or during the adjusting steps provides a more uniform density, but increases processing time because the filler bricks will be resized and moved during the adjusting steps. A variety of rules can be used to implement this function, including the ability to delete the filler brick during the adjusting step entirely.

Preferably, once filler bricks are inserted, they are merged with each other where possible to establish connectivity.

As explained above, for each of the plurality of strips, a spacing between bricks and a brick thickness of each brick is adjusted as a function of i) a location of a brick in adjacent strips corresponding to the same conductor; ii) a desired brick thickness; and iii) a desired brick spacing. Preferably, this function (hereinafter the "loss function") is programmed to increase the brick thickness up to a preferred maximum thickness and increase a spacing between bricks up to a desired brick spacing. This process is repeated for each strip in a predetermined (or even random) order, such that each strip is processed a plurality of times, until the loss function: (i) is stable within a desired tolerance; (ii) reaches a desired value, or (iii) otherwise is indicative of an acceptable result. Alternatively, the process may terminate after a predetermined number of iterations regardless of the value of the loss function.

The loss function may furthermore include "hard" constraints such as minimum dimensions of thickness and space, for instance by setting the loss function to infinity or a very high number in case of violation of any of these constraints. In addition, constraints can ensure that even if bricks of the same conductor lose geometrical connection a re-connecting piece of conductor can be added in a final step without causing conflicts (violation of any DR) with any other adjacent shape in the layout. For example, the constraints can require that the added shape have a minimum thickness as dictated per DR, and have a minimum distance to any other conductor again as per DR. Any number of mathematical functions or procedures could be used to implement the loss function.

Preferably, the loss function is programmed to uniformly space (up to the desired spacing) and thicken (up to the desired brick thickness) the bricks with the constraint that connectivity with adjacent bricks of the same conductor in adjacent strips is maintained or can be re-established by additional re-connecting shapes. FIG. 7 illustrates the manner in which connections can be re-connected in a final optimization step. Referring to FIG. 7, and moving from left to right, an initial layout (FIG. 7(a)) has five conductors arranged from top to bottom. The first and fifth conductors each include one brick having a via. The second, third, and fourth conductors each include four bricks. When the bricks are moved in an intermediate optimization step (FIG. 7(b)) geometrical connectivity may be lost. However, this is acceptable, provided that, in a subsequent or final step, these connections can be re-established without creating conflicts with other bricks (FIG. 7(c)). FIGS. 7(d) and 7(e) illustrate the case of such a conflict, where the movement of a portion of the fourth conductor of FIG. 7(a) has caused a conflict with the fifth conductor. Preferably, connectivity information is stored (typically in a database) during the optimization steps, and consulted by the optimization process to ensure that the movement of bricks does not cause such conflicts, and to re-connect the conductors in a subsequent or final optimization step.

During optimization, the loss function is preferably minimized to find an optimum thickness and position of each brick. This minimization can either be analytically or numerically defined, for example, depending on the complexity of the function.

In order to shorten processing time, it may also be acceptable not to identify the true optimum position and thickness of a brick but rather an acceptable position and thickness. This method can be helpful to reduce the number of iterations needed to reach a sufficiently stable result. It is preferably used if the loss function is known to be only weakly dependent on brick position which is typically the case for bricks that are at a relatively wide distance from any other conductor.

Further, instead of calculating the optimum position and thickness of each brick individually, groups of bricks can be optimized in one step. Although in this case the corresponding loss function is more complicated and has more variables (namely, position and thickness of all bricks in a group), this may help to speed up the calculation and reach a more global redistribution result.

In accordance with other embodiments of the present invention, the method can use a more complex loss function to guide the adjusting step.

For example, the shape and position of bricks remote from (i.e. not adjacent to) the brick under consideration can also be included in order to achieve a more global redistribution of bricks.

It is also often desirable to limit the number of jogs (conductor edges perpendicular to the preferential routing directions, such as induced by changes in conductor thickness) along a conductor path. Therefore, the loss function can consider, as a factor, the desirability of aligning adjacent bricks of the same conductor with one another both in terms of thickness and position. For example, this can be accomplished by including a "bonus" in the loss function if brick thickness and/or edge positions align to that of the neighbor brick of the same conductor. This is illustrated in FIGS. 8(a) through 8(c). FIG. 8(a) illustrates an initial unoptimized layout. FIG. 8(b) illustrates jogs that may be generated during optimization if the loss function of the optimization process does not take into account the undesirability of such jogs. FIG. 8(c) illustrates an optimized layout in which the loss function of the optimization process has provided a weight or bonus if brick thickness and/or edge positions align to that of the neighbor brick of the same conductor. In FIG. 8(c), in the uppermost conductor, two circles indicate where the brick thickness and edge positions have been aligned by the loss function, whereas in the middle conductor, a circle indicates where only one of the edge positions has been aligned by the loss function.

Moreover, although "jogs" form one or two complex shapes when cut out by the brick construction algorithm, by moving these jogs to brick boundaries before start of the optimization, it is often possible to reduce such a brick in complexity and convert to a pair of non-complex bricks that can subsequently be included in the optimization procedure. This is illustrated in FIG. 9. FIG. 9(a) shows the original layout of a conductor with a jog. As illustrated in FIG. 9(b), when the conductor is divided into bricks, the jog is converted into a complex (non-rectangular) shape. However, if the jog is moved to a brick boundary (as illustrated in FIG. 9(c)), a set of regular (rectangular) bricks result that can be moved during optimization and re-connected in a final step.

It is also generally desirable not only to provide spacing among bricks within a strip, but also to provide spacing between a brick and diagonally adjacent bricks from other conductors in adjacent strips. As such, the loss function can be programmed to increase a diagonal space between each brick in a strip and diagonally adjacent bricks from other conductors in adjacent strips up to a specified maximum value.

Similarly, changes to the thickness or shape of a conductor can make signals faster or slower, which may or may not be desirable depending on the electrical requirements dictated by circuit functionality ("timing"). Therefore, in accordance with a further aspect of the present invention, the system and method allows a user to restrict the movement or resizing of selected conductors. Additional flexibility can also be provided. For example, the system and method may allow a user to specify rules on a brick by brick basis, preferably in combination with one or more default rule sets to govern bricks for which individual rules have not be specified.

It should be noted that the increase in distance between conductors does not only improve the Extra Material Critical Area but also helps to minimize unwanted electrical interaction between conductors ("crosstalk"). Typically the described algorithm will widen small spaces and thus lead to an improvement in crosstalk. In addition, for signals that are known to be specifically sensitive to crosstalk, the loss function can incorporate this information in order to either prevent an increase in crosstalk, or even actively help to reduce it—for instance by setting the distance to all adjacent conductors constant, or set a lower limit on this distance, or assign an additional loss term on the distance in order to give it a greater weight in relation to other terms in the loss function.

Further, it has been reported an ideal conductor is wider at its source (where an electrical pulse or signal is generated) and thinner at its destination (where said signal is being received). As such, the loss function can be implemented to favor wider bricks at strips at or near the source of a conductor and thinner bricks at strips at or near the destination of a conductor.

As the optimization result in the case of more complex optimization criteria will depend on a set of control parameters it is desirable to support the user in the proper choice of settings for said control parameters. In one preferred embodiment, pre-fabricated sets of control parameters are supplied to the user so that not each parameter has to be specified individually by the user. Instead, the user selects only one of several pre-fabricated sets that will produce a typical result "style" and thus has to supply only a very limited number of basic parameters. For instance, the user may select a style that produces a minimum of jogs, or a layout least sensitive to Shorts, or a layout least sensitive to Opens, depending on the main objective set by the user. In another embodiment, control parameters may be tuned by the algorithm itself. To that end, various choices of control parameters are tested on small but representative portions of the layout first. The one set that produces the most desirable result on those small portions is subsequently used to optimize the full layout.

It is also possible to align control parameters to the basic dimensions of the layout by simple scaling rules. If, for instance, dimensions in a new technology shrink by a factor of k compared to a previous technology, and the same result should be achieved in the new technology as in the previous, control parameters have to be modified in a predictable proportion (either stay constant, scale by k, or 1/k, etc.), depending on the role of the parameter in the algorithm.

In the preceding specification, the invention has been described with reference to specific exemplary embodiments and examples thereof. It will, however, be evident that various modifications and changes may be made thereto without departing from the broader spirit and scope of the invention as set forth in the claims that follow. In particular, instead of optimizing a layout layer by layer, considering each layer independently, it is also possible to modify several layers in one optimization run—considering also interdependencies between layers mainly dictated by the connecting contact or via holes. In the case of layers that have no or only a weak preferential routing direction, optimization can be done in both dimensions, either sequentially, or in a calculation considering both dimensions simultaneously. The specification and drawings are accordingly to be regarded in an illustrative manner rather than a restrictive sense.

What is claimed is:

1. A method for optimizing routing on a substrate, comprising:
    defining with a computer a plurality of strips in parallel on an initial routing layout of conductors for a layer of a substrate, each conductor within each strip defining a brick; and
    for each of the plurality of strips, selectively adjusting with the computer a spacing between bricks and a brick thickness of each brick as a function of i) a location of a brick in adjacent strips corresponding to the same conductor; ii) a desired brick thickness; and iii) a desired brick spacing to generate a new routing layout.

2. The method of claim 1, wherein the substrate is an integrated circuit.

3. The method of claim 1, wherein the substrate is a printed circuit board.

4. The method of claim 1, wherein the plurality of strips extend in a direction perpendicular to a preferential routing direction of the initial routing layout.

5. The method of claim 1, wherein the selectively adjusting step further comprises:
    (a) selecting a first of the plurality of strips, and selectively adjusting a spacing between bricks and a brick thickness of each brick as a function of i) a location of a brick in adjacent strips corresponding to the same conductor in the initial routing layout; ii) a desired brick thickness; and iii) a desired brick spacing to provide an interim routing layout;
    (b) selecting a second of the plurality of strips, adjacent to the first of the plurality of strips, and selectively adjusting a spacing between bricks and a brick thickness of each brick as a function of i) a location of a brick in adjacent strips corresponding to the same conductor in the interim routing layout; ii) a desired brick thickness; and iii) a desired brick spacing to provide a current interim routing layout; and
    (c) defining a next adjacent one of the plurality of strips as the second one of the plurality of strips and the current interim routing layout as the interim routing layout, and repeating step (b) until a desired degree of stability in the current interim routing layout is achieved, said current interim routing layout being said new layout.

6. The method of claim 5, wherein steps (b) and (c) sequentially select adjacent strips from left to right and then from right to left across the plurality of strips.

7. The method of claim 6, wherein steps (b) and (c) sequentially select adjacent strips from right to left and then from left to right across the plurality of strips.

8. The method of claim 5, further comprising inserting, after step (b) and before step (c), additional bricks into one or more of the strips to increase material density.

9. The method of claim 5, wherein, during steps (a) through (c), adjacent bricks of a same conductor can be separated in an interim routing layout provided that they can be reconnected in a subsequent routing layout.

10. The method of claim 1, wherein the selectively adjusting step further comprises not moving bricks having vias therein.

11. The method of claim 1, further comprising:
before the selectively adjusting step, identifying one or more conductors that are not to be moved; and
wherein the selectively adjusting step further comprises not moving bricks corresponding to said identified conductors.

12. The method of claim 1, further comprising:
before the selectively adjusting step, identifying one or more conductors that are not to have a change in thickness; and
wherein the selectively adjusting step further comprises not changing the brick thickness of any brick corresponding to said identified conductors.

13. The method of claim 1, further comprising inserting additional bricks into one or more of the strips to increase material density.

14. The method of claim 13, wherein the additional bricks are inserted before the selectively adjusting step.

15. The method of claim 13, wherein the additional bricks are inserted after the selectively adjusting step.

16. The method of claim 1, wherein the defining step further comprises receiving as input a desired width for the plurality of strips.

17. The method of claim 1, wherein the function minimizes jogs.

18. A layout optimization tool comprising a processor programmed to perform the steps of:
defining a plurality of strips in parallel on an initial routing layout of conductors for a layer of an integrated circuit or printed circuit board, each conductor within each strip defining a brick; and
for each of the plurality of strips, selectively adjusting a spacing between bricks and a brick thickness of each brick as a function of i) a location of a brick in adjacent strips corresponding to the same conductor; ii) a desired brick thickness; and iii) a desired brick spacing to generate a new routing layout.

19. The layout optimization tool of claim 18, wherein the strips extend in a direction perpendicular to a preferential routing direction of the routing layout.

20. The layout optimization tool of claim 18, wherein the selectively adjusting step further comprises:
(a) selecting a first of the plurality of strips, and adjusting a spacing between bricks and a brick thickness of each brick as a function of i) a location of a brick in adjacent strips corresponding to the same conductor in the initial routing layout; ii) a desired brick thickness; and iii) a desired brick spacing to provide an interim routing layout;
(b) selecting a second of the plurality of strips, adjacent to the first of the plurality of strips, and adjusting a spacing between bricks and a brick thickness of each brick as a function of i) a location of a brick in adjacent strips corresponding to the same conductor in the interim routing layout; ii) a desired brick thickness; and iii) a desired brick spacing to provide a current interim routing layout; and
(c) defining a next adjacent one of the plurality of strips as the second one of the plurality of strips and the current interim routing layout as the interim routing layout, and repeating step (b) until a desired degree of stability in the current interim routing layout is achieved, said current interim routing layout being said new layout.

21. The layout optimization tool of claim 18, wherein steps (b) and (c) sequentially select adjacent strips from left to right and then from right to left across the plurality of strips.

22. The layout optimization tool of claim 18, wherein, the selectively adjusting step further comprises not moving bricks having vias therein.

23. The layout optimization tool of claim 18, the processor programmed to perform the steps of:
before the selectively adjusting step, identifying one or more conductors that are not to be moved; and
wherein the selectively adjusting step further comprises not moving bricks corresponding to said identified conductors.

24. The layout optimization tool of claim 18, the processor programmed to perform the steps of:
before the selectively adjusting step, identifying one or more conductors that are not to have a change in thickness; and
wherein the selectively adjusting step further comprises not changing the brick thickness of any brick corresponding to said identified conductors.

25. The layout optimization tool of claim 18, the processor programmed to perform the steps of inserting additional bricks into one or more of the strips to increase material density.

26. Computer readable media having stored thereon a computer executable program operable to instruct a computer to perform the steps of:
defining a plurality of strips in parallel on an initial routing layout of conductors for a layer of an integrated circuit, each conductor within each strip defining a brick; and
for each of the plurality of strips, selectively adjusting a spacing between bricks and a brick thickness of each brick as a function of i) a location of a brick in adjacent strips corresponding to the same conductor; ii) a desired brick thickness; and iii) a desired brick spacing to generate a new routing layout.

* * * * *